US012587082B2

(12) United States Patent
Harriman et al.

(10) Patent No.: US 12,587,082 B2
(45) Date of Patent: Mar. 24, 2026

(54) DYNAMIC AC DROOP CONTROL FOR DC-DC REGULATORS

(71) Applicant: SEMICONDUCTOR COMPONENTS INDUSTRIES, LLC, Scottsdale, AZ (US)

(72) Inventors: Paul J. Harriman, Indian Harbour, FL (US); Basil Almukhtar, Dooradoyle (IE)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 334 days.

(21) Appl. No.: 18/395,962

(22) Filed: Dec. 26, 2023

(65) Prior Publication Data

US 2024/0405656 A1      Dec. 5, 2024

Related U.S. Application Data

(60) Provisional application No. 63/505,452, filed on Jun. 1, 2023.

(51) Int. Cl.
| | |
|---|---|
| *H02M 1/00* | (2007.01) |
| *H02M 1/088* | (2006.01) |
| *H02M 3/156* | (2006.01) |

(52) U.S. Cl.
CPC ....... *H02M 1/0022* (2021.05); *H02M 1/0012* (2021.05); *H02M 1/0025* (2021.05); *H02M 1/088* (2013.01); *H02M 1/0009* (2021.05); *H02M 3/156* (2013.01)

(58) Field of Classification Search
CPC .. H02M 3/156; H02M 1/0009; H02M 1/0012; H02M 1/0025
See application file for complete search history.

(56) References Cited

U.S. PATENT DOCUMENTS

| | | | |
|---|---|---|---|
| 7,863,875 B1 | 1/2011 | Guo et al. | |
| 8,350,551 B2 * | 1/2013 | Weng .................. | H02M 3/1588 323/224 |
| 9,831,767 B2 * | 11/2017 | Suryanarayana ..... | H02M 3/156 |
| 2001/0030529 A1 * | 10/2001 | Stanley ................ | H02M 3/156 323/280 |
| 2002/0125871 A1 | 9/2002 | Groom et al. | |
| 2004/0051510 A1 * | 3/2004 | Saggini ................ | H02M 3/157 323/282 |

(Continued)

*Primary Examiner* — Gary A Nash
(74) *Attorney, Agent, or Firm* — Polansky & Associates, P.L.L.C.; Paul J. Polansky

(57) ABSTRACT

A controller for a power converter for providing an output voltage across a load by modulating a current through an inductive element includes a pulse width modulator stage, a droop signal generation circuit, and a first summing device. The pulse width modulator stage is configured to modulate current into the inductive element in response to an error signal. The droop signal generation circuit is configured to form an alternating current (AC) droop signal in response to controlling a current feedback signal indicative of a current through the inductive element, and to provide a droop signal in response to the AC droop signal. The first summing device is configured to provide the error signal in response to a difference between a sum of a voltage feedback signal and the droop signal, and a reference voltage.

24 Claims, 5 Drawing Sheets

(56) References Cited

U.S. PATENT DOCUMENTS

| | | | |
|---|---|---|---|
| 2005/0200340 A1 | 9/2005 | Jochum et al. | |
| 2013/0300392 A1* | 11/2013 | Laur | H02M 3/156 |
| | | | 323/284 |
| 2014/0002047 A1* | 1/2014 | Houston | H02M 3/156 |
| | | | 323/283 |
| 2014/0021929 A1 | 1/2014 | Lin et al. | |
| 2014/0292300 A1* | 10/2014 | Yan | H02M 3/156 |
| | | | 323/288 |
| 2015/0222183 A1* | 8/2015 | Karlsson | H02M 3/156 |
| | | | 323/271 |
| 2017/0222553 A1* | 8/2017 | Grbo | H02M 3/156 |
| 2019/0131872 A1* | 5/2019 | Cheng | H02M 3/157 |
| 2019/0199212 A1* | 6/2019 | Jiang | H02M 1/08 |
| 2021/0119532 A1* | 4/2021 | Zou | H02M 1/0025 |

* cited by examiner

DYNAMIC AC DROOP CONTROL FOR DC-DC REGULATORS

This application claims the benefit of U.S. Provisional Patent Application No. 63/505,452, filed on Jun. 1, 2023, the entire contents of which are incorporated herein by reference.

FIELD OF THE DISCLOSURE

This disclosure relates generally to power converters, and more specifically to power converters with droop compensation.

BACKGROUND

DC-DC converters are a type of voltage regulator that converts one direct current (DC) voltage to another DC voltage. Pulse-width modulation (PWM) controllers are a type of controller useful for DC-DC converters that provide a stable output voltage efficiently over wide load ranges. For some applications, PWM controllers create a precision-controlled output impedance to improve transient response during changing load conditions. As the load increases, the output voltage droops in a resistive manner to lower the voltage. When the load is later released and decreases, the precision-controlled output impedance allows more voltage margin to contain the load release overshoot. This substantially constant output impedance can be created by measuring the current flowing in the output inductor, and summing a percentage of the inductor current with a feedback voltage to create voltage droop, giving the system a controlled output impedance as the regulator regulates to VOUT−Ai× inductor current, where VOUT is the output voltage and Ai is a droop resistance (Rdroop).

It has been difficult, however, to balance alternating current (AC) droop and DC droop automatically, since DC droop impedance changes with changes in the load, while minimizing the amount of AC droop to just the amount needed to maintain loop stability.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well. The following Detailed Description is directed to electronic circuitry, and the description of a block shown in a drawing figure implies the implementation of the described function using suitable electronic circuitry, unless otherwise noted.

DETAILED DESCRIPTION

A well-known effect of negative current feedback in a PWM control system is improved control loop stability. For some design cases, it may be desirable to maintain a given amount of alternating current (AC) droop at the crossover frequency of the voltage control loop to stabilize the control loop, while having an adjustable amount of direct current (DC) droop.

According to various embodiments disclosed herein, a voltage regulator feedback system maintains the AC droop but balances it with DC droop, while avoiding adding more droop than is required to stabilize the system. This voltage regulator feedback system controls an AC voltage droop to maintain a sufficient amount of current feedback at the control loop crossover frequency to maintain both stability and optimal regulation.

In some embodiments, it automatically mixes AC and DC inductor current feedback in the voltage feedback loop to maintain a controlled output impedance while also maintaining sufficient current feedback at the control loop crossover frequency to maintain both stability and optimal regulation.

In some embodiments, it controls the AC droop signal by subtracting the DC droop signal from the AC droop signal prior to high pass filtering the AC droop signal, in which the high pass filtering creates the AC droop signal, before summing both the resulting AC droop and the DC droop together. Accordingly, the AC droop and the DC droop are automatically balanced as the DC droop impedance changes with changes in the load, while minimizing or reducing the amount of AC droop injected to just the amount needed to maintain a stable control system.

Figure 1:
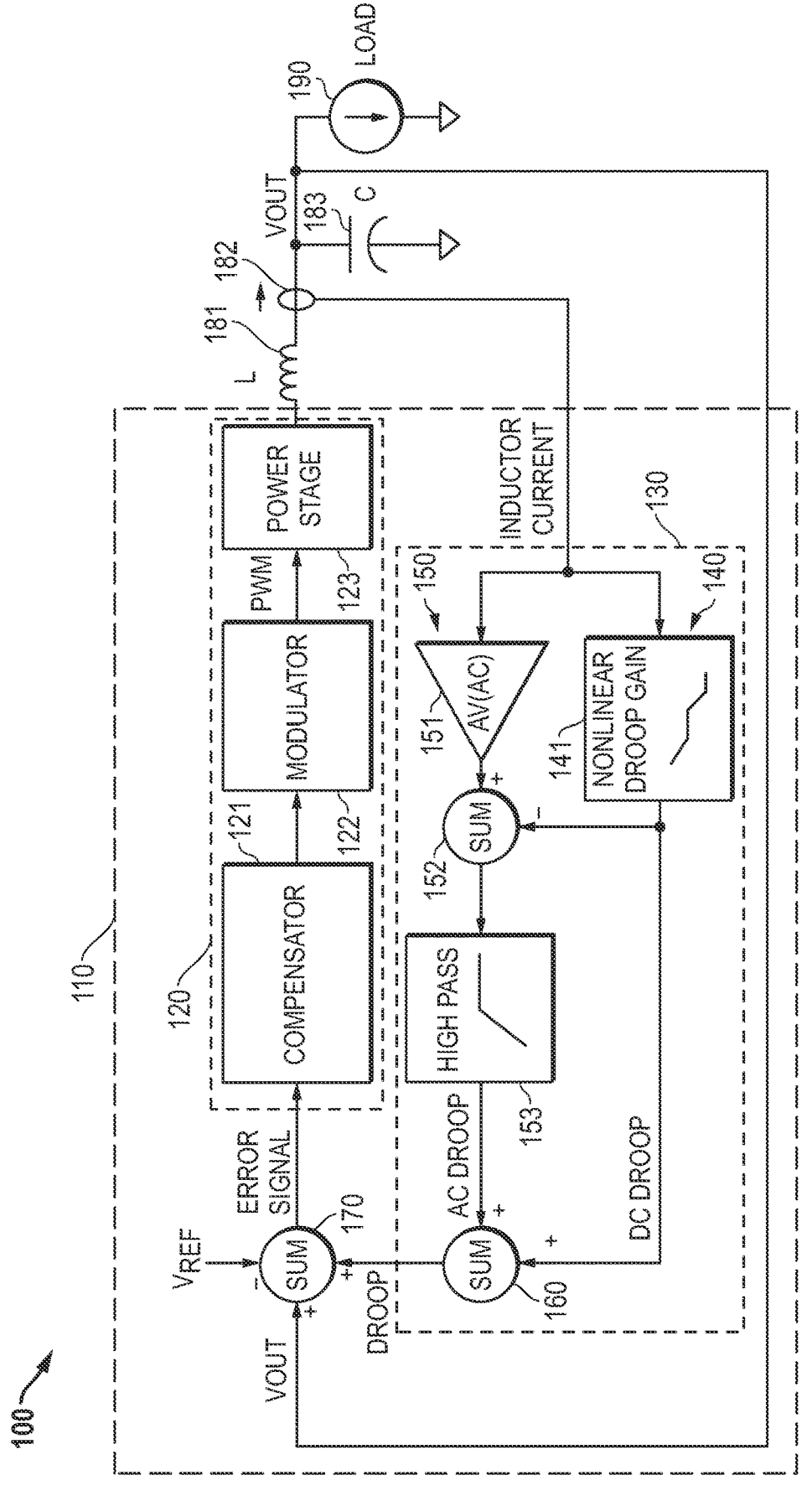
FIG. 1 illustrates in partial block diagram and partial schematic form a power converter according to various embodiments of the present disclosure.

FIG. 1 illustrates in partial block diagram and partial schematic form a power converter 100 according to various embodiments of the present disclosure. Power converter 100 includes generally a pulse width modulation (PWM) controller 110, an inductive element 181, a current sensor 182, an output capacitor 183, and a load 190 modelled as a current source.

PWM controller 110 includes generally a PWM stage 120, a droop signal generation circuit 130, and a summing device 170. PWM stage 120 includes a compensator 121, a modulator 122, and a power stage 123. Compensator 121 has an input for receiving a signal labelled "ERROR SIG-NAL", and an output. Modulator 122 has an input connected to the output of compensator 121, and an output for providing a signal labelled "PWM". Power stage 123 has an input connected to the output of modulator 122, and an output.

Droop signal generator circuit 130 includes generally a DC circuit path 140, an AC circuit path 150, and a summing device 160. DC circuit path 140 includes a nonlinear droop gain element 141. Non-linear droop gain element 141 has an input, and an output for providing a signal labelled "DC DROOP". AC circuit path 150 includes a gain element 151, a summing device 152, and a high pass filter 153. Gain element 151 has an input connected to the output of current sensor 182, and an output, and has an associated gain labelled "AV(AC)", and amplifies the current feedback signal (the INDUCTOR CURRENT). Summing device 152 has a positive input connected to the output of gain element 151, a negative input connected to the output of nonlinear droop gain element 141, and an output. High pass filter 153 has an input connected to the output of summing device 152, and an output for providing a signal labelled "AC DROOP". AC circuit path 150 is configured to high pass filter a difference between an amplified signal proportional to the current feedback signal (INDUCTOR CURRENT) and the DC DROOP signal to provide the AC DROOP signal. In other words, AC circuit path 150 forms the AC DROOP signal by subtracting the DC DROOP signal from the amplified current feedback signal to form a difference signal, and high pass filtering the difference signal.

Summing device 160 has a first positive input connected to the output of nonlinear droop gain element 141, a second positive input connected to the output of high pass filter 153, and an output for providing a droop signal labelled "DROOP" as the sum of the DC DROOP and the AC DROOP.

Summing device 170 has a first positive input connected to the output of summing device 160 for receiving the DROOP signal, a second positive input for receiving an output voltage labelled "VOUT", a negative input for receiving a reference voltage labelled "$V_{REF}$", and an output connected to the input of compensator 121 for providing the ERROR SIGNAL.

Inductive element 181 has a first terminal connected to the output terminal of power stage 123, and a second terminal for providing output voltage VOUT. Current sensor 182 is connected to the second terminal of inductive element 181, and has an output terminal connected to the input of non-linear droop gain element 141 for providing a current sense signal. Capacitor 183 has a first terminal connected to the second terminal of inductive element 181, and has a second terminal connected to ground. Load 190 has a first terminal connected to the second terminal of inductive element 181, and a second terminal connected to ground.

In operation, PWM controller 110 alternately drives the first terminal of inductive element 181 either to an input power supply voltage (not shown in FIG. 1), or ground. As such, it operates as a buck converter. In particular, PWM stage 120 is configured to modulate the current through inductor 181 in response to the ERROR SIGNAL. Summing device 170 provides the ERROR SIGNAL in response to the difference between, a sum of a voltage feedback signal (VOUT) and the droop signal (DROOP), and a reference voltage $V_{REF}$. Compensator 121 filters the ERROR SIGNAL for loop stability to provide a compensated ERROR SIGNAL at its output. Modulator 122 then drives the PWM signal to power stage 123 in response to the compensated ERROR SIGNAL. Thus, modulator 122 modulates a pulse width of a drive signal (the signal at the output of power stage 123) provided to a terminal of an inductive element (the first terminal of inductor 181) in response to an error signal (the ERROR SIGNAL). In some embodiments, the PWM signal includes both a drive high signal to make a first power transistor in power stage 123 connected between a power supply voltage and the first terminal of inductive element 181 conductive, and a drive low signal to make a second power transistor in power stage 123 connected between the first terminal of inductive element 181 and ground conductive. As is well known, the drive high and drive low pulses are slightly non-overlapping to avoid shoot-through currents.

Inductive element 181 resists a sudden change in current and power stage 123 drives output current into the load in proportion to the duty cycle indicated by the PWM signal. Current sensor 182 measures the current through inductive element 181. In one form, current sensor 182 is a low-valued resistor that generates a voltage across the resistor's terminals that is proportional to the current flowing through it. In another form, current sensor 182 is a secondary winding of a transformer, in which inductive element 181 is the primary winding that is inductively coupled to the secondary winding. In yet another form, current sensor 182 is a Hall effect sensor. Output capacitor 183 is an output voltage capacitor to smooth VOUT, and in one form is a relatively large-valued electrolytic capacitor. Load 190 is electrically modeled as a current source, in which the value of the current source varies based on the operation of the load circuit being powered. For example, load 190 may be a microcontroller or other digital electronic circuit whose operation and current draw changes dramatically based on its operation and its power state. In this common example, load 190 will cause power supply droop when the load increases, and power supply spiking when the load suddenly decreases.

Generally, power converter 100 is regulated by the value of the ERROR SIGNAL that is generated based on the difference of VOUT and reference voltage $V_{REF}$, but that varies based on the DC DROOP and the AC DROOP. In some embodiments, the value of VOUT is reduced using a resistive divider and the divided voltage is compared to a proportionately reduced VREF to generate the ERROR SIGNAL.

In particular, power converter 100 determines the voltage droop (i.e., the DROOP signal) and regulates the duty cycle of the PWM signal in response to a difference between a sum of a voltage feedback signal and the droop signal, and a reference voltage. In other words:

$$\text{ERROR SIGNAL}=(VOUT+\text{DROOP})-V_{REF} \qquad [1]$$

In particular, power converter 100 generates the DROOP signal by forming the AC DROOP signal in response to controlling the current feedback signal indicative of a current through inductive element 181. In the embodiment shown in FIG. 1, power converter 100 controls the current feedback signal by applying a nonlinear gain to the current feedback signal, subtracting the DC DROOP signal from the gain-adjusted inductor current, and high pass filtering the difference between gain-adjusted inductor current signal and the DC DROOP signal. PWM controller 110 then adds the AC DROOP signal to the DC DROOP signal to provide a measure of the total droop.

As disclosed herein, power converter 100 recognizes that it may be desirable to maintain a given amount of AC droop at the crossover frequency of the voltage control loop to stabilize the control loop, and also to have an adjustable amount of DC droop. PWM controller 110 maintains the AC droop and balances it with the DC droop while not adding more droop than is required to stabilize the system. PWM controller 110 automatically mixes AC and DC inductor current feedback in the voltage loop to maintain a controlled output impedance while maintaining sufficient current feedback at the control loop crossover frequency to maintain both stability and optimal regulation. It does this function by subtracting the DC droop signal from the AC droop signal path prior to high pass filter 153. Thus, DC circuit path 140 provides the DC DROOP signal in response to applying a non-linear droop gain across a range of values of the current feedback signal. High pass filter 153 creates the AC DROOP signal by filtering out the lower frequency components of the induction current. Droop signal generation circuit 130 sums both the resulting AC DROOP signal and the DC DROOP signal together in summing device 160 to form the overall DROOP signal. PWM controller 110 automatically balances AC droop and DC droop as the load changes, while reducing the amount of AC droop injected to just the amount needed to maintain a stable control system.

The circuit blocks described with respect to PWM controller 110 can be implemented on a monolithic integrated circuit, or with discrete circuit components, or with various combinations of the two. In addition, the circuit blocks can be implemented in the continuous time/analog domain, the digital domain, or some combination of the two. A digital implementation of droop signal generation circuit 130 will now be described.

Figure 2:
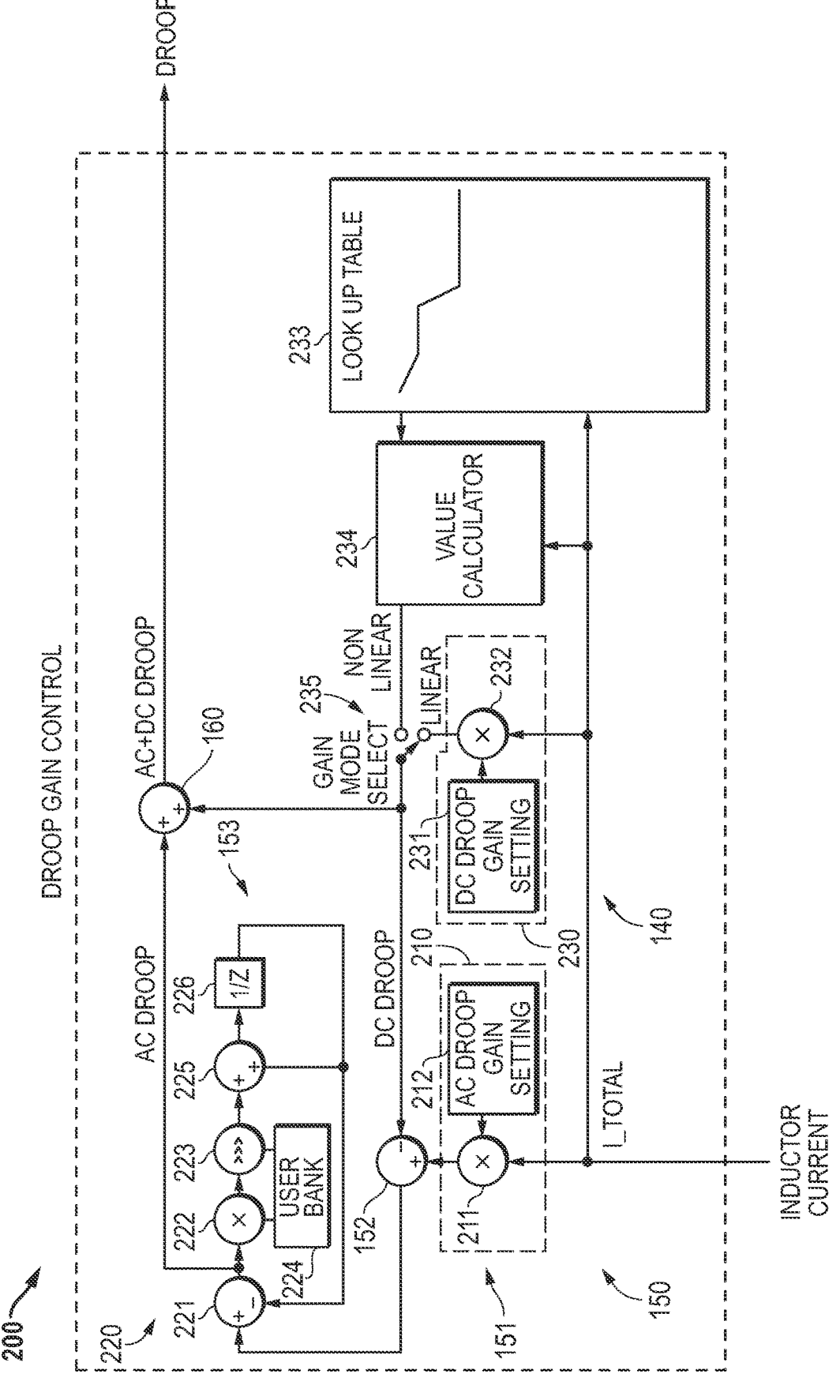
FIG. 2 illustrates in block diagram form a digital droop signal generation circuit corresponding to the droop signal generation circuit of FIG. 1.

FIG. 2 illustrates in block diagram form a digital droop signal generation circuit 200 corresponding to droop signal generation circuit 130 of FIG. 1. Digital droop signal generation circuit 200 includes generally circuitry for implementing DC circuit path 140, AC circuit path 150, and summing device 160 in the digital domain, and FIG. 2 shows the digital circuit elements corresponding to these elements of FIG. 1.

DC circuit path 140 is implemented with a digital droop gain element 230. Digital droop gain element 230 includes a register 231, a multiplier 232, a look-up table 233, and a value calculator 234. Register 231 stores a value known as the DC DROOP GAIN SETTING, and has an output. Multiplier 232 has a first input connected to the output of register 231, a second input for receiving a digital value of the inductor current labelled "I_TOTAL", and an output for providing a signal labelled "LINEAR". Look-up table 233 has an input for receiving the I_TOTAL signal, and an output. Value calculator 234 has a first input for receiving the I_TOTAL signal, a second input connected to the output of look-up table 233, and an output for providing a signal labelled "NON LINEAR". Switch 235 has a first input connected to the output of multiplier 232, and second input connected to the output of value calculator 234, and an output for providing the DC DROOP signal that is switched between the first and second inputs thereof in response to a signal labelled "GAIN MODE SELECT".

AC circuit path 150 includes a gain element 151, a summing device 152, and a high pass filter 153. Gain element 151 is implemented with a digital gain element 210. Digital gain element 210 includes a multiplier 211 and a register 212. Multiplier 211 has a first input for receiving the I_TOTAL signal, a second input, and an output. Register 212 has an output connected to the second input of multiplier 211 for providing a value labelled "AC DROOP GAIN SETTING".

Summing device 152 is implemented as a digital summing device having a positive input terminal connected to the output of multiplier 211, a negative input connected to the output of switch 235, and an output. High pass filter 153 is implemented with a digital high pass filter 220. Digital high pass filter 220 has an input connected to the output of summing device 152, and an output for providing the AC DROOP signal. Digital high pass filter 220 includes a summing device 221, a multiplier 222, a shifter 223, a coefficient bank 224 labelled "USER BANK", a summing device 225, and a delay element 226. Summing device 221 has a positive input connected to the output of summing device 152, a negative input, and an output for providing the AC DROOP signal. Multiplier 222 has a first input connected to the output of summing device 221, a second input, and an output. Shifter 223 has a first input connected to the output of multiplier 222, a second input, and an output. Coefficient bank 224 is a user-programmable bank of coefficients for the second input of multiplier 222 and the second input of shifter 223. Summing device 225 has a first positive input connected to the output of shifter 223, a second positive input, and an output. Delay element 226 has an input connected to the output of summing device 225, and an output connected to the negative input of summing device 221 and to the second positive input of summing device 225.

Summing device 160 has a first positive input connected to the output of high pass filter 153 for receiving the AC DROOP signal, a second positive input connected to the output of switch 235, and an output for providing a droop signal labelled "DROOP" as the sum of the AC DROOP signal and the DC DROOP signal.

Digital droop signal generation circuit 200 is a digital implementation of droop signal generation circuit 130, and provides features that make it flexible for different application environments. It is implemented in the digital/sampling domain and implements digital high pass filter 220 as an infinite impulse response (IIR) filter. Digital high pass filter 220 provides programmable values so the user can adjust the transfer function and cutoff frequency by appropriately setting the values of coefficients in coefficient bank 224, and thereby trade off responsiveness and stability. Multiplier 222 and shifter 223 together provide a fractional gain between 0 and 1 in which a value closer to 0 provides a slower response and a value closer to 1 provides a faster response. Digital droop gain element 230 also allows the selection of either a linear adjustment to the DC signal or a non-linear adjustment based on the state of the GAIN MODE SELECT signal, increasing flexibility to select an appropriate DC adjust mechanism based on each particular application.

Figure 3:
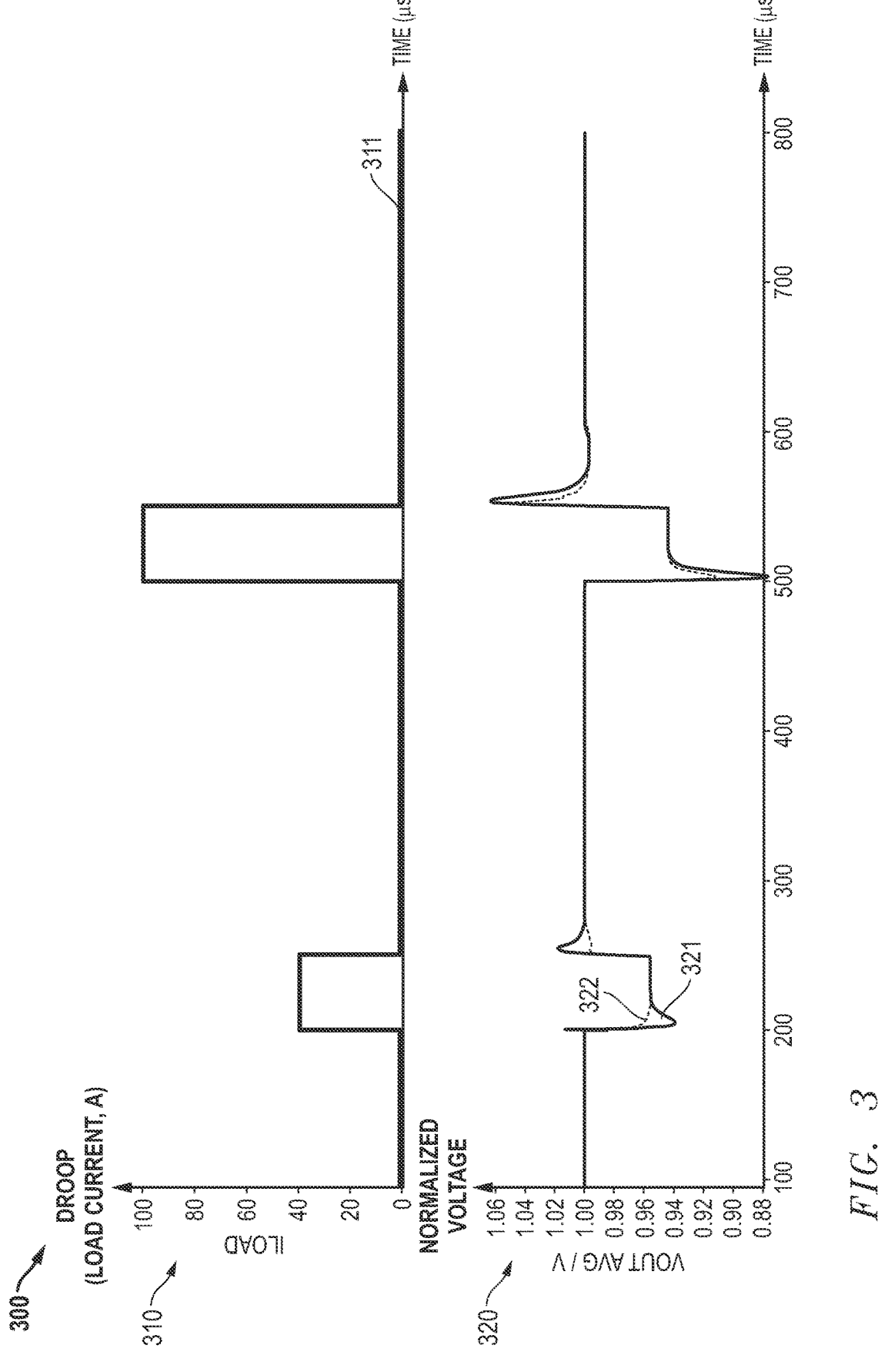
FIG. 3 illustrates a set of timing diagrams showing the operation of the droop signal generation circuit of the controller of FIG. 1.
Figure 4:
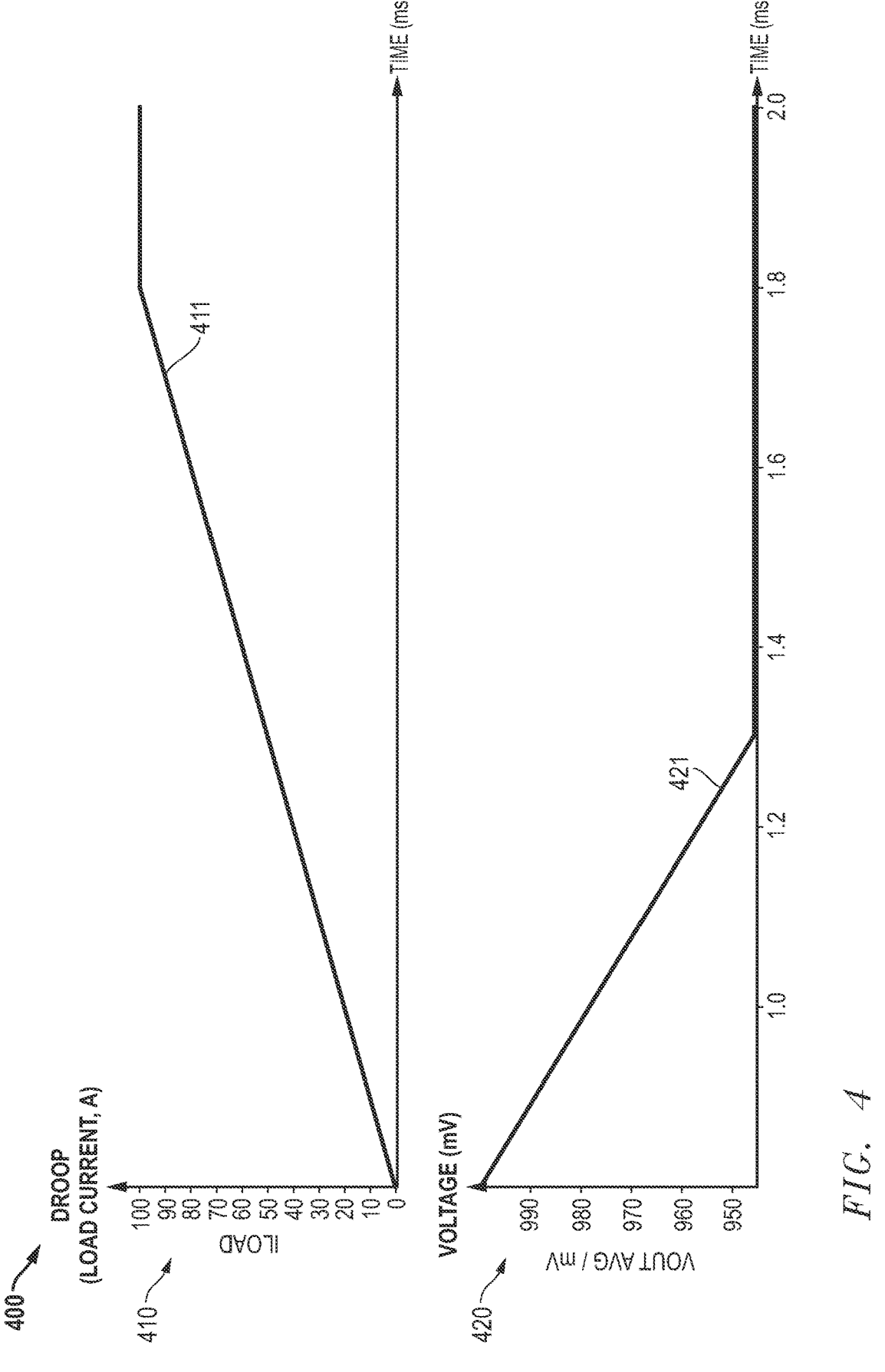
FIG. 4 illustrates another set of timing diagrams showing the operation of the droop signal generation circuit of the controller of FIG. 1.

FIG. 3 illustrates a set of timing diagrams 300 showing the operation of droop signal generation circuit 130 in PWM controller 110 of FIG. 1. In timing diagrams 300, the horizontal axes represent time in microseconds (µs). In a first timing diagram 310, the vertical axis represents the load current in amperes (A). In a second timing diagram 320, the vertical axis represents the instantaneous output voltage VOUT normalized with respect to the nominal output voltage V. In first timing diagram 310, an exemplary waveform 311 shows a relatively small step change in load that occurs at around 200 µs that lasts for around 50 µs, followed by a relatively large step change in load at around 500 µs that lasts for around 50 µs. Timing diagram 320 shows the resulting droop in VOUT as a waveform 321 without the droop compensation shown as a solid line, and a waveform 322 with the droop compensation shown as a dashed line. As shown in timing diagrams 300, the system regulation is improved by reducing the spikes after both a moderate step increase in load followed by a load release, and a large step increase in load and droop followed by a load release. In both cases, the improvement results by adding the controlled AC droop to VOUT to generate the error signal provided to the input of PWM stage 120. The first load transient in waveforms 321 and 322 illustrates droop versus load in a linear droop range (as shown in FIG. 4 below), and the second load transient illustrated in waveforms 321 and 322 demonstrates droop versus load across a non-linear droop range, such as when the load current exceeds about 40 A. Thus, waveform 322 shows that the droop signal generation circuit improves regulation by controlling the AC droop, e.g., by subtracting the DC droop from the inductor current feedback before forming the AC droop signal and before summing the AC droop signal and the DC droop signal as described in FIGS. 1 and 2.

FIG. 4 illustrates another set of timing diagrams 400 showing the operation of droop signal generation circuit 130 in PWM controller 110 of FIG. 1. In timing diagrams 400, the horizontal axes represent time in milliseconds (ms). In a first timing diagram 410, the vertical axis represents the load current in amperes (A). In a second timing diagram 420, the vertical axis represents the instantaneous output voltage VOUT in millivolts (mV), drooping as a function of load. An exemplary waveform 411 shows a gradual increase in load that occurs at 0 ms and lasts until around 1.8 ms. A second waveform 421 shows the decrease in output voltage when subtracting a non-linear DC droop signal the AC signal as the load is increased. Second waveform 421 shows a gradual decrease in VOUT until around 1.3 ms when VOUT falls to about 945 mV, at which point the non-linear DC droop transfer function flattens VOUT while the load current further increases.

Figure 5:
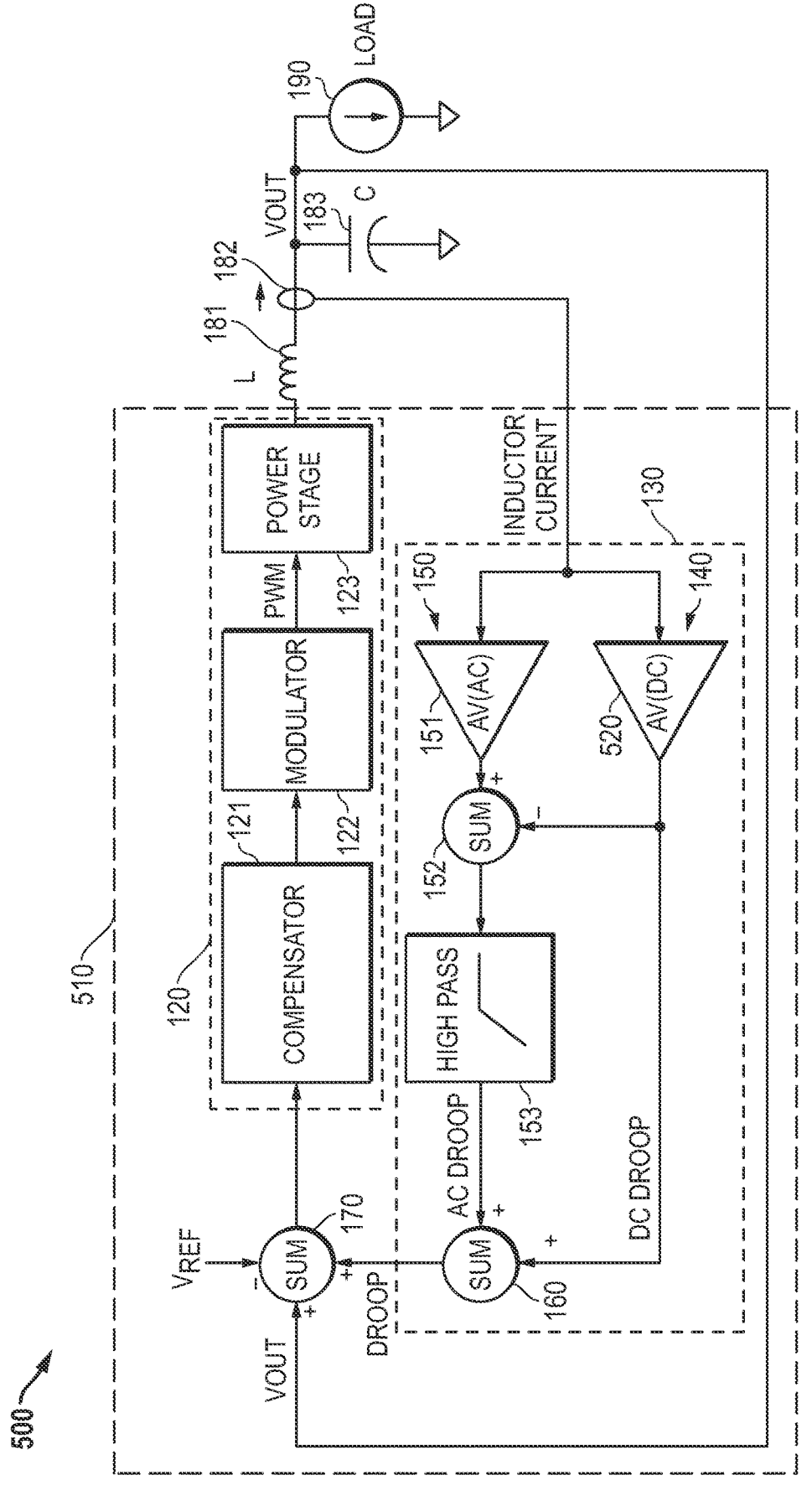
FIG. 5 illustrates in partial block diagram and partial schematic form a power converter according to other embodiments of the present disclosure.

FIG. 5 illustrates in partial block diagram and partial schematic form a PWM power converter 500 according to embodiments of the present disclosure. PWM power converter 500 is similar to PWM power converter 100 of FIG. 1, except it includes PWM controller 510. PWM controller 510 is similar to PWM controller 110 of FIG. 1, with one exception. In PWM controller 510, DC circuit path 140 is implemented with a linear gain element 520 that applies a constant gain labelled "AV(DC)" to the INDUCTOR CURRENT signal to provide the DC DROOP signal. By implementing a linear DC gain element, PWM controller 510 can be easily implemented with only analog components. While less robust than an implementation using a nonlinear droop gain, it is simpler to implement for cost-sensitive applications and may be sufficient to provide a desired level of loop stability for the sizes of expected step increases and decreases in the load.

The above-disclosed subject matter is to be considered illustrative, and not restrictive, and the appended claims are intended to cover all such modifications, enhancements, and other embodiments that fall within the scope of the claims. For example, the AC droop signal can be controlled in various ways. Moreover, portions of a PWM controller with dynamic AC droop compensation, such as the AC circuit path, can be implemented in either the analog domain or the digital domain. The DC droop compensation can be either linear or have a non-linear transfer function over the expected range of output voltages. The components of the PWM controller can be combined in a monolithic integrated circuit, or some of the components can be implemented with discrete components, such as the transistors in the power stage. The current sensor in the converter can also be implemented in a variety of ways. In some embodiments, the PWM controller can be replaced by other modulation techniques, such as pulse density modulation (PDM) and the like. Certain components such as the high pass filter coefficients can be programmable in a variety of ways, such as registers accessible through low pin-count interfaces, fuse banks, mask programmable options, and the like. Also, while certain features of the PWM controller, converter, and method were disclosed, in typical embodiments they would include other features not relevant to the disclosed droop compensation technique.

Thus, to the maximum extent allowed by law, the scope of the present invention is to be determined by the broadest permissible interpretation of the following claims and their equivalents, and shall not be restricted or limited by the forgoing detailed description.

What is claimed is:

1. A controller for a power converter for providing an output voltage across a load by modulating a current through an inductive element, the controller comprising:

a pulse width modulator stage configured to modulate the current through the inductive element in response to an error signal;

a droop signal generation circuit configured to form an alternating current (AC) droop signal in response to controlling a current feedback signal indicative of the current through the inductive element, and to provide a droop signal in response to the AC droop signal; and a first summing device configured to provide the error signal in response to a difference between a sum of a voltage feedback signal and the droop signal, and a reference voltage.

2. The controller of claim 1, wherein the droop signal generation circuit comprises a high pass filter that is configured to form the AC droop signal.

3. The controller of claim 2, wherein the droop signal generation circuit is further configured to apply a droop gain to the current feedback signal, and wherein the high pass filter is configured to form the AC droop signal in response to a difference between the current feedback signal and a direct current (DC) droop signal.

4. The controller of claim 3, wherein the droop gain is non-linear.

5. The controller of claim 3, wherein the droop signal generation circuit is further configured to form the droop signal by adding the AC droop signal to the DC droop signal.

6. The controller of claim 1, wherein the droop signal generation circuit comprises:

a DC circuit path configured to provide a DC droop signal in response to an application of a non-linear gain to the current feedback signal;

an AC circuit path configured to high pass filter a difference between the DC droop signal and an amplified signal proportional to the current feedback signal to provide the AC droop signal; and a second summing device configured to provide the droop signal as a sum of the AC droop signal and the DC droop signal.

7. The controller of claim 6, wherein the DC circuit path comprises:

a nonlinear droop gain element having an input for receiving the current feedback signal, and an output for providing the DC droop signal.

8. The controller of claim 7, wherein the AC circuit path comprises:

a gain element having an input for receiving the current feedback signal, and an output;

a third summing device having a positive input coupled to the output of the gain element, a negative input for receiving the DC droop signal, and an output; and a high pass filter having an input coupled to the output of the third summing device, and an output for providing the AC droop signal.

9. A power converter comprising:

an inductive element having a first terminal and a second terminal adapted to be coupled to a load;

an output capacitor having a first terminal coupled to the second terminal of the inductive element, and a second terminal coupled to ground; and a controller comprising:

a pulse width modulator stage configured to modulate current through the inductive element in response to an error signal;

a droop signal generation circuit configured to form an alternating current (AC) droop signal in response to controlling a current feedback signal indicative of the current through the inductive element, and to provide a droop signal in response to the AC droop signal; and a first summing device configured to provide the error signal in response to a difference between a sum of a voltage feedback signal and the droop signal, and a reference voltage.

10. The power converter of claim 9, wherein the droop signal generation circuit comprises a high pass filter that is configured to form the AC droop signal.

11. The power converter of claim 10, wherein the droop signal generation circuit is further configured to apply a droop gain to the current feedback signal, and wherein the high pass filter is configured to form the AC droop signal in response to a difference between the current feedback signal and a direct current (DC) droop signal.

12. The power converter of claim 11, wherein the droop gain is non-linear.

13. The power converter of claim 12, wherein the droop signal generation circuit is further configured to form the droop signal by adding the AC droop signal to the DC droop signal.

14. The power converter of claim 9, wherein the droop signal generation circuit comprises:

a DC circuit path configured to provide a DC droop signal in response to an application of a non-linear gain to the current feedback signal;

an AC circuit path configured to high pass filter a difference between the DC droop signal and an amplified signal proportional to the current feedback signal to provide an AC droop signal; and a second summing device configured to provide the droop signal as a sum of the AC droop signal and the DC droop signal.

15. The power converter of claim 14, wherein the DC circuit path comprises:

a nonlinear droop gain element having an input for receiving the current feedback signal, and an output for providing the DC droop signal.

16. The power converter of claim 15, wherein the AC circuit path comprises:

a gain element having an input for receiving the current feedback signal, and an output;

a third summing device having a positive input coupled to the output of the gain element, a negative input for receiving the DC droop signal, and an output; and a high pass filter having an input coupled to the output of the third summing device, and an output for providing the AC droop signal.

17. A method for providing an output voltage across a load by modulating a current through an inductive element, comprising:

modulating a pulse width of a drive signal provided to a terminal of the inductive element in response to an error signal;

forming an alternating current (AC) droop signal in response to a current feedback signal indicative of the current through the inductive element, the forming comprising controlling the forming;

forming a droop signal in response to the AC droop signal; and providing the error signal in response to a difference between a sum of a voltage feedback signal and the droop signal, and a reference voltage.

18. The method of claim 17, wherein forming the AC droop signal comprises:

amplifying the current feedback signal; and providing the AC droop signal in response to the amplified current feedback signal.

19. The method of claim 18, further comprising:

forming a direct current (DC) droop signal based on the current feedback signal, wherein forming the AC droop signal comprises subtracting the DC droop signal from the amplified current feedback signal to form a difference signal, and high pass filtering the difference signal.

20. The method of claim 19, wherein forming the DC droop signal comprises:

providing the DC droop signal in response to applying a non-linear droop gain across a range of values of the current feedback signal.

21. A controller for a power converter for providing an output voltage across a load by modulating a current through an inductive element, the controller comprising:

means for modulating a pulse width of a drive signal provided to a terminal of the inductive element in response to an error signal;

means for forming an alternating current (AC) droop signal in response to a current feedback signal indicative of the current through the inductive element, the means for forming the AC droop signal comprising means for controlling the forming;

means for forming a droop signal in response to the AC droop signal; and means for providing the error signal in response to a difference between a sum of a voltage feedback signal and the droop signal, and a reference voltage.

22. The controller of claim 21, wherein the means for forming the AC droop signal comprises:

a gain element having an input for receiving the current feedback signal, and an output;

a third summing device having a positive input coupled to the output of the gain element, a negative input for receiving a DC droop signal, and an output; and a high pass filter having an input coupled to the output of the third summing device, and an output for providing the AC droop signal.

23. The controller of claim 22, wherein the means for controlling the forming comprises:

a nonlinear droop gain element having an input for receiving the current feedback signal, and an output for providing the DC droop signal by applying a applying a non-linear droop gain across a range of values of the current feedback signal.

24. The controller of claim 22, wherein the means for controlling the forming comprises:

a linear droop gain element having an input for receiving the current feedback signal, and an output for providing the DC droop signal by applying a constant gain across a range of values of the current feedback signal.

* * * * *